Patented Apr. 1, 1924.

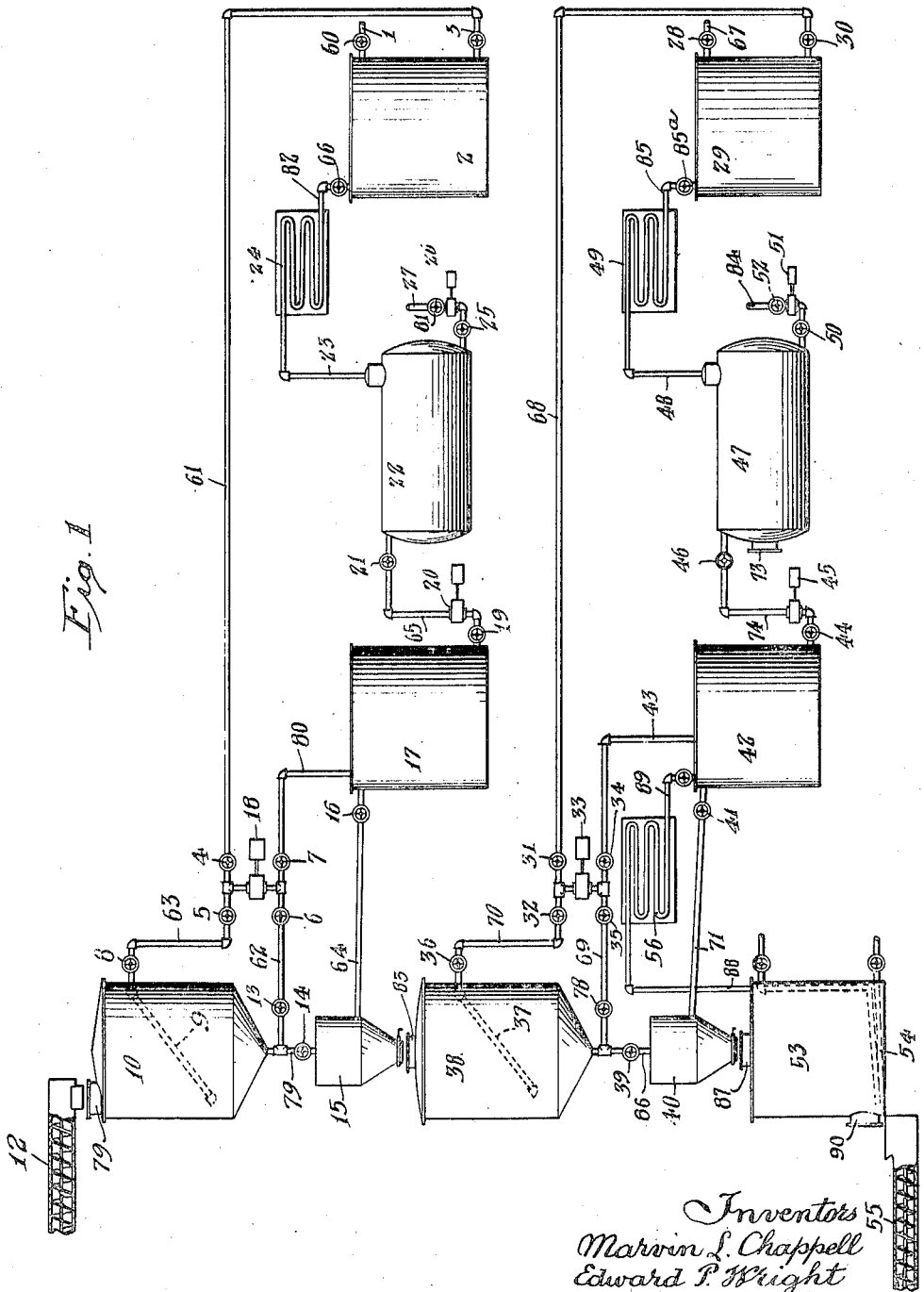

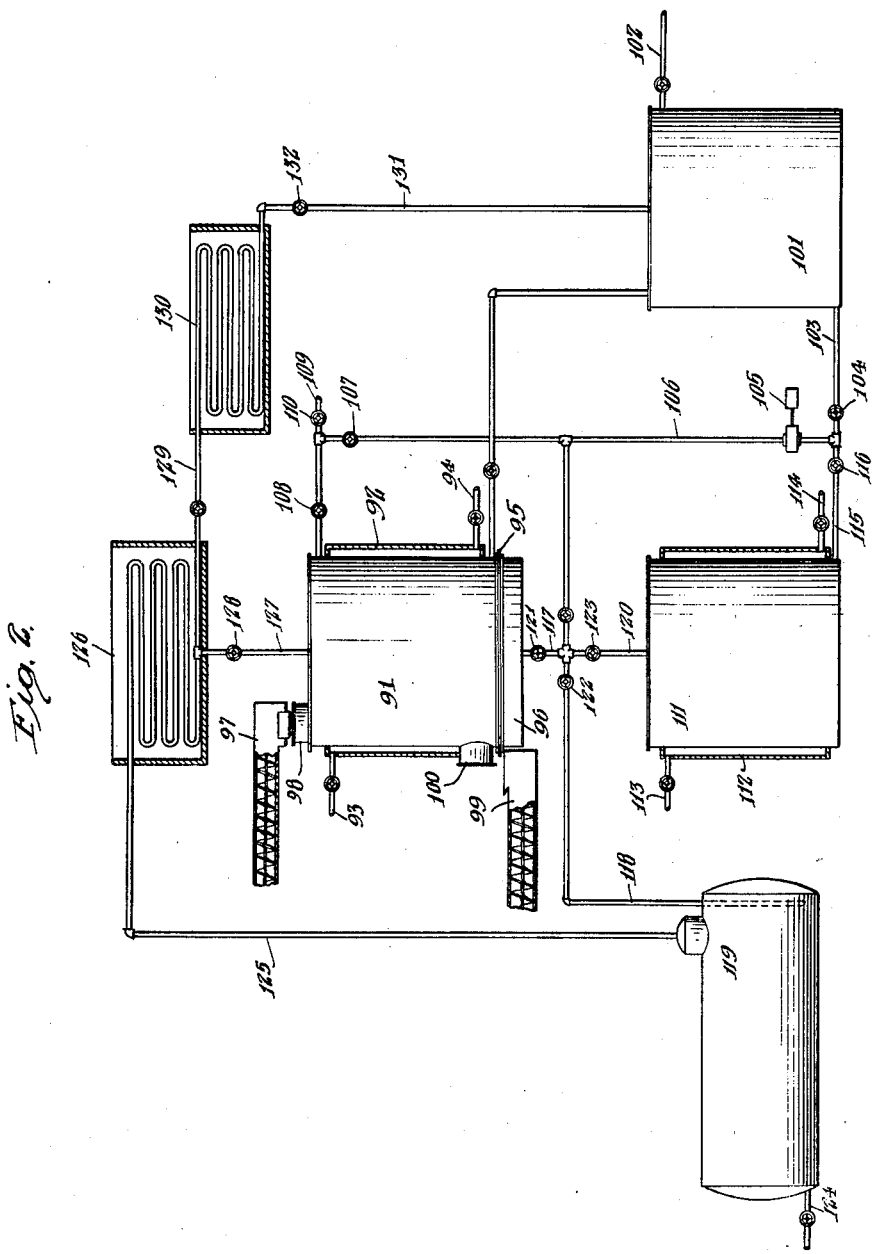

1,488,805

UNITED STATES PATENT OFFICE.

MARVIN L. CHAPPELL, EDWARD P. WRIGHT, AND MERLE M. MOORE, OF EL SEGUNDO, CALIFORNIA, ASSIGNORS TO STANDARD OIL COMPANY, OF SAN FRANCISCO, CALIFORNIA, A CORPORATION OF CALIFORNIA.

PROCESS OF TREATING SPENT CLARIFYING AND DECOLORIZING AGENTS.

Application filed December 28, 1922. Serial No. 609,393.

*To all whom it may concern:*

Be it known that we, MARVIN L. CHAPPELL, EDWARD P. WRIGHT, and MERLE M. MOORE, citizens of the United States, residing at El Segundo, in the county of Los Angeles and State of California, have invented a new and useful Process of Treating Spent Clarifying and Decolorizing Agents, of which the following is a specification.

This invention relates to the revivification of clarifying or decolorizing agents which have been used for clarifying or decolorizing petroleum oils, and is especially adapted for revivifying such clarifying or decolorizing agents as are described in the co-pending application of Marvin L. Chappell, Richard F. Davis and Merle M. Moore, filed August 1, 1921, Serial No. 488,952.

The object of this invention is to revivify spent clarifying or decolorizing agents with solvents whereby the original active power of the clay may be restored and the petroleum oil retained in the clay recovered. While hitherto the revivification of fuller's earth has been accomplished through a number of different processes embodying the use of special solvents, when such processes are applied to an extremely active clay, such as those referred to, we have found that the original active power of the clay is not properly restored. Apparently when applied to materials having active powers greatly in excess of fuller's earth, the solvents hitherto used are not capable of extracting all the coloring matter and other absorbed matter from the clay or properly restoring to the clay its original active power.

We have discovered that if such clays be treated with acetone containing an acid in solution or a mixture of acetone and methyl alcohol, containing an acid in solution, that between 80 and 95% of the active power of the clay can be recovered. We have found particularly that acetone or mixtures of acetone and methyl alcohol containing hydrochloric acid are exceptionally effective for extracting the coloring matter from the clay and restoring active power.

We have further found that the restoring of the active powers of the clay, the recovery of the petroleum oil retained by the clay, and the recovery of the solvents employed in the process may be most economically conducted in apparatus which will be herein described.

Reference is therefore made to the following drawings which illustrate diagrammatically preferred apparatus in which the process may be conducted.

Figure 1 is a diagrammatic view of an apparatus suitable for conducting the revivification of spent clay in which the petroleum oil is extracted separately in the coloring matter.

Fig. 2 is a diagrammatic view of an apparatus in which the revivification may be carried out in one or two steps as preferred.

Referring to Figure 1 of the drawings, 10 indicates an agitating tank provided at its top with a man-hole 79 into which a conveyor 12 is positioned to empty, said conveyor leading from a source of spent clay (not shown). To the bottom of the tank 10 is connected a line 62 which is provided with suitable valves 13 and 6 and leads to the outlet end of a pump 18. To the inlet end of the pump 18 is connected a line 63 controlled by valves 8 and 5 which terminates in the agitating tank 10 in a swing pipe section 9. Thus said tank 10 is provided with a circulating system comprising the swing pipe 9, line 63, the pump 18 and line 62.

Leading from the inlet side of the pump 18 is provided a line 61 which is controlled by valves 4 and 3 and communicates with an oil solvent tank 2 at its bottom. Said tank 2 is provided with a suitable inlet line 1 controlled by a valve 60 which leads to a source of oil solvent (not shown).

The bottom of the agitating tank 10 is connected by a line 79 controlled by a valve 14 which communicates with a filter 15. The filter 15 may be of any of a number of constructions and is provided with a line 64, controlled by a valve 16, which line is adapted to conduct a filtered liquid to a used oil solvent tank 17. A line 80 controlled by the valve 7 connects the outlet end of the pump 18 to the top of said tank 17.

Said tank 17 is provided with a pump line 65 which discharges into a still 22. The pump line 65 comprises a pump 20 having on each side thereof a valve as indicated by 19 and 21. Said still may be of any of a number of constructions which are adapted to distill volatile solvent. Said still 22 is provided with a drawoff line 27 which is shown comprising a pump 26, and valves 25 and 81. A vapor line 23 leads from the top of the still 22 to a condenser 24. Said condenser discharges through a line 82 controlled by valve 66 into the oil solvent tank 2.

A treating tank 38 is positioned to receive clay from the filter 15 and is provided therefore with a man-hole 83 at its top. To the bottom of said tank is connected a line 69 including suitable valves 78 and 35 which connects said tank 38 with the outlet end of a pump 33. The inlet end of said pump is connected by a line 70 controlled by valves 32 and 36 to said tank 38 and terminates inside thereof in a swing pipe section 37.

29 indicates a color solvent tank which is connected through a line 68 controlled by valves 30 and 31 to the inlet end of the pump 33. Said tank 29 is provided with an inlet line 67 containing a suitable valve 28 which leads to a source of color solvent (not shown).

42 indicates a used color solvent tank into which a line 43 discharges, said line 43 being connected to the outlet end of the pump 33 and controlled by a valve 34. A pump line 74 connects the tank 42 with a still 47, said line comprising a pump 45 and suitable control valves 44 and 46.

The still 47 is provided at one end with a man-hole 73 and at the other with a discharge line 84, which is shown comprising a pump 51 and control valves 50 and 52. The still 47 is provided with a vapor line 48 leading to a condenser 49. The condenser discharges through a line 85 controlled by valve 85ª into the oil solvent tank 29.

A line 86 connects the bottom of the treating tank 38 to a filter 40. Said filter may be of any of a number of constructions and is provided with a line 71 controlled by a valve 41 which discharges into the used color solvent tank 42.

An evaporating tank 53 is positioned under the filter 40 and is provided with a man-hole 87 through which the clay may be introduced from the filter. A suitable steam coil 54 is provided within the evaporating tank 53. 88 indicates a vapor line which leads from the evaporating tank 53 to a condenser 56. Said condenser discharges through a line 89 into the tank 42. At the bottom of the evaporating tank 53 is provided a man-hole 90 and a conveyor 55 is positioned under the man-hole and is adapted to conduct away the finished clay.

In conducting the process an oil solvent is first introduced into the tank 2. Said solvent may consist of gasoline, benzol or other light fractions of petroleum. A color solvent is introduced into the tank 29, said solvent preferably is composed of commercial acetone of 90% purity and has dissolved in it from 1 to 4% hydrochloric acid. To this solvent various amounts of methyl alcohol may be added without materially affecting its powers.

The oil solvent is pumped from the tank 2 through the line 61 and 62 into the agitating tank 10, valves 3, 4, 6 and 13 being open and the valves 5, 7, and 14 being closed. A suitable quality of spent clay is then introduced by the conveyor 12 into the extracting tank and the man-hole closed. By opening valves 8 and 5 and closing the valve 4, the solvent and entrained clay is then circulated by operation of pump 18, being taken through the swing pipe 9 passing through lines 63 and 62. The circulation is continued until the mineral oil contained in the clay is dissolved by the solvent. The pump 18 is then stopped and the clay and mineral oil solvent allowed to settle until the clay separates leaving the oil solvent at the top. By lowering or raising the swing pipe 9 most of the solvent and dissolved petroleum oil is then separated from the clay being drawn by the pump 18 through the lines 63 and 80 to the used oil solvent tank 17, during which the valves 13, 6 and 4 are closed and valves 8, 5 and 7 are open.

In a similar manner the clay contained in the agitating tank 10 may be given a second washing with an oil solvent by closing valves 13 and 8 and opening valve 14. The clay solvent is then run into the filter 15 where the clay is separated from the remaining solvent which is conducted through the line 64 to the tank 17. The solvent in the tank 17 now contains the petroleum oil which was originally in the spent clay and may be separated therefrom by distillation in the still 22, the solvent being condensed in the condenser 24 and returned to the tank 2. The oil left in the still is then drawn off through the discharge line 81.

The clay filtered through the oil solvent is introduced from the filter 15 through the man-hole 83 into treating tank 38. A suitable supply of color solvent is pumped into the tank 38 through the lines 68 and 69 by operation of the pump 33. Valves 30, 31, 35 and 78 being open and 39, 34, 32 and 36 being closed. By closing the valve 31 and opening the valves 32 and 36, the clay is then agitated with the color solvent by circulation through the line 70 and 69. This is continued until the oil solvent dissolves the majority of the coloring matter in the clay. The circulation is then stopped and the clay and solvent allowed to separate. The majority of the solvent is then drawn off through the swing pipe 37 by operation of the pump 33 and run into the tank 42. During this operation valves 36, 32 and 34 are open and valves 78, 35 and 31 are closed. Clay in the tank 38 may then be agitated again after the introduction of fresh solvent from the tank 29 and such process repeated as many times as desired.

Generally two or three washings with the solvent will be sufficient to remove all the coloring matter in the clay.

The clay is finally run into the filter 40 through the line 39 where the retained solvent is drawn off through the line 71 and introduced into the tank 42. The filtered clay for the maximum recovery of the solvent is then introduced into the evaporating tank 53 whereupon, by application of heat through suitable means such as the steam coil 54, the solvent is evaporated from the clay and recovered in the condenser 56 and discharged into the tank 42. The dried clay is then removed through the man-hole 90 conducted by conveyor 53 to storage and may be ground and re-used for the filtration, decolorizing and clarifying of petroleum oils.

The color solvent in the tank 42 contains all the coloring matter and petroleum acids originally in the clay and may be removed therefrom by distillation in the still 47. The vapors are condensed in the condenser 49 and discharged into the tank 29.

Referring to Fig. 2 of the drawings, there is shown a modified form of apparatus by which the revivification of the clay may be carried out in one step or in two steps and in which such revivification is carried out by some modified process.

91 indicates an extractor which is provided with a steam jacket 92. A steam inlet 93 and outlet 94 communicates with said steam jacket. The bottom of said extractor 91 is covered by a filter plate 95 which is grooved and perforated according to well known methods of construction and over which is spread a filter cloth or canvas. A shell 96 is bolted to the extractor 91 and holds the filter cloth in place. The conveyor 97 leading from a source of spent clay (not shown) is positioned to empty into a man-hole 98 provided at the top of extractor 91. A conveyor 99 is positioned at the bottom of the extractor into which the clay may be emptied through a man-hole 100 provided near the bottom of said extractor.

A storage tank 101 is provided for holding the solvent and is equipped with an inlet 102 and is connected at its bottom through a line 103 controlled by a valve 104 to the inlet end of a pump 105. The outlet end of said pump communicates through a line 106, controlled by valves 107 and 108, with the top of the extractor 91. 109 indicates a line communicating with a steam supply (not shown) connected with the line 106 and controlled by a valve 110.

111 indicates a receiving tank provided with a water jacket 112. A water inlet 113 and outlet 114 communicate with said water jacket. The bottom of the tank 111 is connected by line 115, controlled by a valve 116, to the inlet end of the pump 105.

119 indicates a still which is connected by a line 118 to a line 117 leading from the bottom of the shell 96. The line 117 also communicates with the line 120 discharging into the receiving tank 111. Suitable valves 121, 122 and 123 control the communication between the respective lines.

The still 119 is provided with a draw off line 124 and vapor line 125. Said vapor line is connected to a condenser 126 which discharges through a line 127 controlled by a valve 128 into the top of the extractor 91. Communicating with the line 127 is a line 129 which is connected to a condenser 130. Said condenser discharges through the line 131, controlled by the valve 132, into the storage tank 101.

In operation the spent clay is introduced into the extractor 91 from conveyor 97 following which the man-hole 98 is closed. The solvent is stored in the tank 101 and by operation of pump 105 is introduced into the top of extractor 91 during which valves 104, 107 and 108 are open and valves 110 and 116 are closed. The solvent used, in case the extraction of the petroleum oil, the coloring matter, and the petroleum acids from the clay, is conducted in a single operation preferably consists of a mixture of gasoline and acetone, containing from 1 to 4% by volume of concentrated hydrochloric acid.

The solvent is percolated through the spent agent dissolving the petroleum oil, coloring matter and petroleum acids, the acid content of said solvent liberating the basic coloring matter and converting the petroleum acid salts to petroleum acid. The solvent containing the dissolved petroleum oil, coloring matter and petroleum acids passes through the filter plate 95 into the lower shell 96 and then through lines 117 and 118 into the still 119 during which time the valve 120 is closed and valves 121 and 122 are open.

The solvent as introduced into the still 119 is distilled to free the solvent from the material extracted from the clay, the vapors passing through the line 125 into the condenser 126 from which they are discharged through the line 127 back into the top of the extractor 91. The solvent then percolates again through the clay and such operation may be continued until all the petroleum oil, coloring matter and petroleum acids are dissolved from the clay. The valve 112 is then closed and valve 120 opened and the solvent run into the receiving tank 111. The petroleum oil, coloring matter and petroleum acids may be removed from the still 119 through the drawoff line 124.

The extractor 112 is heated, by supplying steam to the steam jacket 92, to such a temperature as will vaporize all the solvent retained by the agent, said solvent passing through the lines 127 and 129 to the condenser 130 from which it will be discharged through line 131 to the storage tank 101. The solvent in the receiving tank 111 is cooled by running water through the jacket 112 after which it is run through the lines 115 and 103 into the storage tank 101.

The treated clay is then removed from the extractor through the man-hole 100 and carried away to storage by the conveyor 99. The clay may then be ground and reused for further treatment of petroleum oil.

In case it is desired to separate the petroleum oil from the clay before extracting the coloring matter, the clay after being delivered into the extractor 91 is subjected to a steaming process. The extractor 91 and the clay is heated to a temperature preferably exceeding 212° F., by means of the steam jacket 92, after which steam is introduced into the top of the extractor by opening valves 110 and 108, valve 107 being closed. The steam passes through the clay carrying the petroleum oil through the filter 95 passing through lines 117 and 120 into the receiver 111. The steam and petroleum oil are cooled in the receiver 111 by the water jacket 112.

The extraction of the coloring matter is then conducted as previously described. However, in case where the petroleum oil has been first extracted, the solvent used preferably consists of acetone containing 1 to 4% hydrochloric acid in solution, or, acetone and methyl alcohol containing 1 to 4% hydrochoric acid.

The revivified agent may be used again for decolorizing the petroleum oil and revivified apparently an indefinite number of times. The efficiency of the process for restoring the active decolorizing or clarifying powers to the clay is found to be very high, ranging from 80 to 95%, thus when applied to such acid treated clays as already referred to the revivified agent will have around 4 and 5 times the active power of normal fuller's earth.

It is understood that various modifications and changes in the process and apparatus may be made without departing from the spirit of this invention. Our invention is not limited to the specific process and apparatus described but is of the scope set forth in the following claims.

We claim:

1. The process of revivifying spent decolorizing or clarifying clays which comprises washing the spent clay with a color solvent containing acetone and an acid.

2. The process of revivifying spent decolorizing or clarifying clays which comprises washing the clay with a color solvent containing acetone and hydrochoric acid.

3. The process of revivifying spent decolorizing or clarifying clays which includes washing the clay with a solvent containing acetone and 1-4% of hydrochloric acid.

4. The process of revivifying spent clay, which includes treating the clay with a solvent of the coloring matter absorbed by said clay, said solvent being composed substantially of acetone, methyl alcohol and hydrochloric acid.

5. The process of revivifying spent decolorizing or clarifying clays which comprises agitating the clay with a mineral oil solvent, separating said solvent from the clay, agitating the clay with acetone containing hydrochloric acid in solution and separating the clay from the acid.

Signed at El Segundo, Calif. this 19th day of December 1922.

MARVIN L. CHAPPELL.
EDWARD P. WRIGHT.
MERLE M. MOORE.